United States Patent [19]

Gosser

[11] 4,131,646

[45] Dec. 26, 1978

[54] PREPARATION OF HYDROGEN PEROXIDE FROM DIHYDROANTHRACENE HYDROPEROXIDES

[75] Inventor: Lawrence W. Gosser, Wilmington, Del.

[73] Assignee: E. I. Du Pont de Nemours and Company, Wilmington, Del.

[21] Appl. No.: 833,896

[22] Filed: Sep. 16, 1977

[51] Int. Cl.$^2$ ..................... C01B 15/02; C01B 15/022
[52] U.S. Cl. ................................ 423/591; 260/668 F; 423/587
[58] Field of Search .............................. 423/587, 591; 260/668 F

[56] References Cited

U.S. PATENT DOCUMENTS

| 3,109,027 | 10/1963 | Furman et al. | 260/668 F |
| 3,653,832 | 4/1972 | Turner | 423/587 |
| 3,737,518 | 6/1973 | Bonetti et al. | 423/587 |

Primary Examiner—Earl C. Thomas
Assistant Examiner—Wayne A. Langel

[57] ABSTRACT

In a process for the manufacture of hydrogen peroxide wherein a compound containing the anthracene nucleus is hydrogenated to the corresponding 9,10-dihydroanthracene and the resulting 9,10-dihydroanthracene is oxidized to the corresponding 9-(or 10-) hydroperoxide; the step which comprises contacting the hydroperoxide thus produced with an acid catalyst to produce hydrogen peroxide and the starting compound containing the anthracene nucleus.

10 Claims, No Drawings

PREPARATION OF HYDROGEN PEROXIDE FROM DIHYDROANTHRACENE HYDROPEROXIDES

BACKGROUND OF THE INVENTION

1. Field of the Invention

This invention concerns a new method for making hydrogen peroxide by the acid-catalyzed decomposition of certain dihydroanthracene hydroperoxides. This new reaction provides a method for producing hydrogen peroxide by a three-step process in which hydrogen and oxygen are the only materials ultimately consumed.

Hydrogen peroxide is a valuable industrial chemical. Demand for this chemical in the United States in 1975 has been estimated at 72,000 tons (144,000,000 pounds). The compound is used for bleaching natural fibers and blends of natural fibers with synthetic fibers, for bleaching pulp and paper, for making plasticizers and other chemicals such as organic peroxides, amine oxides, epoxides and glycerol, for treating water, and for etching transistors and other electronic components.

2. Relation to the Prior Art

Hydrogen peroxide is presently prepared commercially by processes involving oxidation of hydrocarbyl-substituted anthrahydroquinones to the corresponding anthraquinones and hydrogen peroxide, followed by catalytic hydrogenation of the quinones back to the hydroquinones. References relating to such processes are summarized in U.S. Pat. No. 3,998,937.

The acid-catalyzed decomposition of cyclic organic hydroperoxides to give hydroxyl compounds and aldehydes or ketones is known. See, for example, Swern, "Organic Peroxides," Vo. II, pp. 65–69 (Wiley; 1971). When the hydroperoxy group is bonded to a nuclear carbon of a tetrahydronaphthlene nucleus, the fused-ring structure of the compound causes the hydroxyl and carbonyl functions to be present in the same molecule following acid-catalyzed decomposition. For example, 1,2,3,4-tetrahydro-1-hydroperoxynaphthlene (equivalent, 1,2,3,4-tetrahydronaphthyl 1-hydroperoxide) and the corresponding 1,4-dimethyl derivative react as follows:

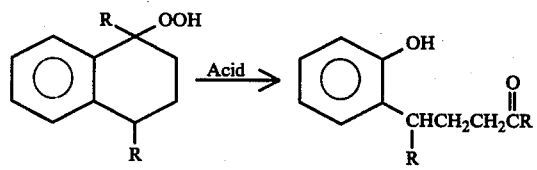

R = H, CH₃

Hydrogenation of anthracene and of alkyl-substituted anthracenes is a known reaction. It can be carried out in the presence of any of a number of catalysts. See for example Garlock and Mosettig, J. Am. Chem. Soc., 67, 2255 (1945). A particularly good catalyst is barium-promoted copper chromite, which is commercially available.

The oxidation of 9,10-dihydroanthracenes to give the corresponding 9-hydroperoxides is also known. See for example Bickel and Kooyman, J. Chem. Soc., 2215 (1956). This reaction is carried out by treating the 9,10-dihydroanthracene with gaseous oxygen in the presence of a free-radical initiator at a temperature in the decomposition range of the initiator. The hydroperoxide can be isolated by conventional methods, either pure or in crude form, usually as a mixture with the corresponding anthracene compound.

The base-catalyzed autoxidation of 9,10-dihydroanthracene to anthraquinone and anthracene is also known. See Hawthorne, et al., ACS Advan. Chem. Ser., 75, 203–215 (1968). Therein, hydrogen peroxide was recovered under basic conditions (p. 214). Under acidic conditions, no recovery of hydrogen peroxide was indicated (p. 209).

SUMMARY OF THE INVENTION

It has been found that the acid-catalyzed decomposition of a hydroperoxide in which the hydroperoxy group is bonded to the 9- or 10-carbon of a 9,10-dihydroanthracene system yields hydrogen peroxide and the parent anthracene compound. Thus, 9,10-dihydro-9-anthryl hydroperoxide reacts as follows:

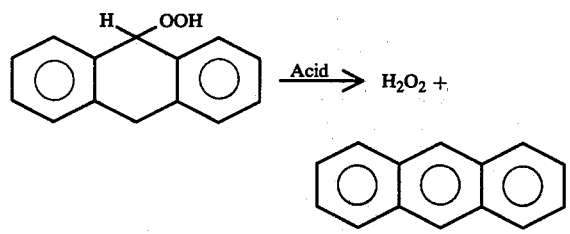

A preferred process utilizing this invention comprises:

(1) hydrogenating a compound containing the anthracene nucleus to the corresponding 9,10-dihydroanthracene compound, (2) oxidizing the 9,10-dihydroanthracene compound formed in Step (1) to the corresponding 9- (or 10-) hydroperoxide, and (3) contacting the hydroperoxide produced in Step (2) with an acid catalyst to produce hydrogen peroxide and the corresponding anthracene compound, which can then be recycled and used again as in Step (1).

The process can be performed stepwise or continuously.

DETAILED DESCRIPTION OF THE INVENTION

Unless otherwise indicated all percentages used herein are weight percentages and all temperatures are expressed in degrees centigrade.

From a commercial standpoint, the process of this invention is especially useful when employed as the third step in the three-step process set forth hereinabove.

The anthracene compounds that can be used in Step 1 include anthracene itself and substituted anthracenes containing up to seven primary or tertiary lower alkyl groups in the 1-, 2-, 3-, 6-, 7-, 9-, and/or 10-positions. Lower alkyl is defined as alkyl of up to six carbons. Examples are anthracene, 1-methylanthracene, 2-methylanthracene, 9-methylanthracene, 1-ethylanthracene, 2-ethylanthracene, 9-propylanthracene, 2-t-butylanthracene, 9-pentylanthracene, 9-hexylanthracene, 1,2-dimethylanthracene, 1,3-dimethylanthracene, 2,6-dimethylanthracene, 9,10-dimethylanthracene, 9-ethyl-10-methylanthracene, 9,10-diethylanthracene, 9-butyl-10-methylanthracene, 9,10-dibutylanthracene, 2,3-di(t-pentyl)anthracene, 1,3,6-trimethylanthracene, 1,2,10-trimethylanthracene, 1,2,3,6-tetramethyl-anthracene, and 2,3,9,10-tetrabutylanthracene.

Preferably the anthracene starting compound will contain one or two alkyl substituents. Methyl is the preferred alkyl substituent, and the most preferred starting material is 9-methylanthracene.

The starting materials useful in step 1 of the above process can generally be represented by the formula:

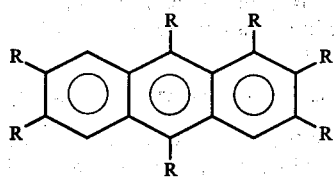

wherein the R's may be the same or different radicals and are primary or tertiary lower alkyl or hydrogen.

The hydrogenation of the anthracene compound can be carried out by reacting the anthracene with hydrogen in the presence of a suitable catalyst, which is well known. A suitable catalyst, for example, is barium-promoted copper chromite.

The oxidation of the 9,10-dihydroanthracenes formed in step 1 is carried out in step 2 by reacting the 9,10-dihydroanthracenes with gaseous oxygen in the presence of a free radical initiator at a temperature in the decomposition range of the initiator. The hydroperoxide thus formed can be isolated by conventional methods, either in pure or crude form, usually as a mixture with the corresponding anthracene compound. It can be used in either of these forms in step 3 of the process of this invention. Alternatively, the solution of the hydroperoxide obtained in step 2 can be used unchanged in step 3.

In step 3, the 9,10-dihydroanthracene 9-hydroperoxide (equivalently, 9,10-dihydro-9-hydroperoxyanthracene) produced in step 2 is brought into contact with a catalytic amount of an acid to produce hydrogen peroxide and the corresponding anthracene compound.

Any of a variety of acids can be used as the catalyst. The catalyst can be an inorganic protonic acid such as hydrogen chloride, sulfuric acid, nitric acid, perchloric acid, or phosphoric acid; an inorganic Lewis acid such as boron trifluoride, boron trifluoride etherate, aluminum chloride, aluminum bromide, zinc chloride, or antimony pentafluoride; or an organic sulfonic acid such as benzenesulfonic acid, toluenesulfonic acid, or naphthalenesulfonic acid. Carboxylic acids such as acetic acid are operable but less effective. In addition, the acid forms of commercially available cation-exchange materials can be used, for example zeolites and polystyrenesulfonic acids.

The amount of acid catalyst present in the reaction mixture is not critical and can be varied widely. Any concentration of the acid can be used as long as it provides a catalytic effect. When an acid other than a solid cation-exchange material is used, the amount of acid present, expressed as a weight percent of the entire reaction mixture, will usually be at least about 0.01% and at most about 1%. Higher concentrations, up to about 10% or even higher, can be used but provide no advantage. When the catalyst is a cation-exchange solid, the amount present will normally be from about 0.1% to about 10% of the entire reaction mixture. These catalysts have the advantage that they can be easily removed from the mixture by filtration when the reaction is complete.

A solvent is not necessary, and if desired the process can be carried out simply by mixing the hydroperoxide, or the mixture containing the hydroperoxide, with the acid catalyst at the desired temperature. Use of a solvent can be advantageous, however, when the hydroperoxide/catalyst mixture is solid or partly solid under reaction conditions. The presence of a solvent can also moderate the reaction in some instances and can make isolation of the hydrogen peroxide easier. Any of a variety of inert organic liquids can be used as solvents. For example, the solvent can be an aromatic hydrocarbon such as benzene, toluene, xylene, or ethylbenzene; or a halohydrocarbon such as chlorobenzene, dichloromethane, trichloromethane, or 1,2-dichloroethane. The solvent should be substantially immiscible with water, to facilitate isolation of the hydrogen peroxide.

The process is conveniently conducted at ordinary temperatures (20°-30° C.). However, the reaction proceeds rapidly at temperatures as low as −10° C. In addition, the process can be conducted at higher than ordinary temperatures if desired, although no particular advantage results. The upper temperature limit is the temperature at which the hydrogen peroxide produced decomposes at an appreciable rate in the particular reaction system. A lower temperature limit is frequently imposed by the decreasing solubility of the hydroperoxide in the reaction system as the temperature is decreased.

In a batch system at ordinary temperatures, the reaction is usually complete within a period varying from a few minutes to 1 hour. When the corresponding anthracene compound that is formed as a byproduct is less soluble in the reaction medium than the hydroperoxide, the progress of the reaction can be monitored by observing the precipitation of the anthracene compound. Such is the case with anthracene itself.

The hydrogen peroxide can be separated from the reaction mixture by extraction with water and then can be concentrated or isolated by conventional procedures. The hydrogen peroxide content of the aqueous extract can be determined by standard iodometric procedures.

The following examples illustrate the process of the invention. Volumes of hydrogen chloride gas are measured at room temperature and atmospheric pressure. The examples are provided for illustrative purposes only and are not intended to limit or restrict the invention in any way.

EXAMPLE 1

A solution of 2.5 g of 9,10-dihydroanthracene and 0.2 g of azobisisobutyronitrile (Du Pont Vazo ® 64) in 7.5 ml of benzene was warmed in a flask immersed in an oil bath at 79° C. and sparged with oxygen at this temperature and atmospheric pressure for 3 hr and 27 min. A white solid formed when the solution was left at room temperature overnight and this solid was separated by filtration. It weighed about 0.6 g and was analyzed and found to be 9,10-dihydroanthryl 9-hydroperoxide. The filtrate was diluted to 10 ml with benzene, and a solution of 6 ml of this liquid and 20 ml of dichloromethane was cooled to −10° C., and then 20 cc of hydrogen chloride gas were added from a syringe. A solid began to precipitate almost immediately, which was found to be anthracene. This mixture was allowed to warm to room temperature over 15 minutes and was then extracted with about 10 ml of water. The aqueous extract was washed twice with 20-ml portions of dichloromethane and then neutralized with sodium bicarbonate, and the mixture was filtered. To the clear filtrate was added 20 ml of glacial acetic acid, 3 drops of aqueous 3% ammonium molybdate, and 2 ml of saturated aqueous potassium iodide solution which formed a dark-red solution. This entire solution was titrated to the disappearance of the iodine color with 0.1 M sodium thiosulfate solution, and 15.4 ml of the thiosulfate solution was required. This indicated an amount of hydrogen peroxide in the aqueous extract corresponding to about a 9% yield based on 9,10-dihydroanthracene.

EXAMPLE 2

A reaction mixture similar to that of Example 1 was sparged with oxygen for 2 hr and 40 min. The mixture was cooled in ice and 10 cc of hydrogen chloride gas were added. A solid (anthracene) immediately precipitated. The procedure of Example 1 was followed, and iodometric titration indicated that hydrogen peroxide had been formed. The yield was 28% based upon 9,10-dihydroanthracene. The presence of hydrogen peroxide was confirmed by gas chromatography and Raman spectroscopy.

EXAMPLE 3

This example illustrates carrying out the process of this invention in the absence of a solvent.

9,10-Dihydro-9-methylanthracene was prepared by pressurizing a mixture of 2 g of 9-methylanthracene, 0.5 g of a barium-promoted copper chromite catalyst (Girdler G-22), and 3 ml of ethyl alcohol with hydrogen to 3000 psi at room temperature, followed by heating the mixture at a temperature of 150° C. for 1 hour with agitation. The product was characterized by nmr spectroscopy. The products of four such runs were combined, and the mixture was vacuum-distilled to give 9,10-dihydro-9-methylanthracene as a pale-yellow solid.

A mixture of 1.4 g of the 9,10-dihydro-9-methyl anthracene and 0.20 g of azobisisobutyronitrile was then melted in a flask immersed in an oil bath at 81° C. and sparged with oxygen at this temperature and atmospheric pressure for 5 hr and 15 min. The mixture was cooled to room temperature, sparged briefly with hydrogen chloride gas, and extracted with 0.5 ml of water. A 0.2-ml portion of the aqueous extract required 2.8 ml of 0.1 M thiosulfate when titrated as in Example 1. This corresponds to about a 5% yield of hydrogen peroxide based on 9,10-dihydro-9-methylanthracene. The presence of hydrogen peroxide in the aqueous extract was shown by gas chromatography through a 3-ft glass column packed with a polystyrene-type packing material (Pora Pak ® Q; Waters Associates) in an instrument equipped with a thermal-conductivity detector.

EXAMPLE 4

This example illustrates the isolation and use of solid 9,10-dihydro-9-anthryl hydroperoxide in the process of the invention. It also shows that this compound need not be completely purified but can be used as a mixture with anthracene.

Oxidation of 9,10-dihydroanthracene substantially as set forth in Example 1 gave a solid that was analyzed by iodometry and nmr and uv spectroscopy to be about 75% 9,10-dihydro-9-anthryl hydroperoxide and about 25% anthracene.

A 1.0-g portion of the solid mixture was dissolved in 10 ml of dichloromethane in a 30-ml test tube. The tube was closed with a rubber septum, and 10 cc of hydrogen chloride gas at room temperature and atmospheric pressure were added from a syringe. A solid began to precipitate almost immediately. After 20 minutes at room temperature, the solid was collected by filtration, washed with 2 ml of dichloromethane, and air-dried. It was analyzed by uv spectroscopy and found to contain about 87% anthracene. The combined filtrate and washing were extracted with three 3-ml portions of water. The aqueous extracts were sparged with nitrogen, and their hydrogen peroxide contents were determined by iodometry. In each of these determinations, 1 ml of the extract was combined with 10 ml of 2 N sulfuric acid, 3 drops of aqueous 3% ammonium molybdate, 0.1 g of sodium bicarbonate, and 1 g of potassium iodide. The first extract (2.7 g) was found to contain 0.9% $H_2O_2$, the second (3.1 g) 0.05% $H_2O_2$, and the third only a trace of $H_2O_2$. The total yield was about 22% based on 9,10-dihydro-9-anthryl hydroperoxide.

Examples 5 and 6 illustrate the use of solid ion-exchange materials as acid catalysts.

EXAMPLE 5

The crude solid 9,10-dihydro-9-anthryl hydroperoxide and anthracene mixture of Example 4 (0.5 g) was dissolved in 5 ml of dichloromethane, and the solution was combined with 0.25 g of HY zeolite (Linde 32-300; the hydrogen form of a Y zeolite; activated in air at 700° C.). The mixture was stirred for 30 minutes at room temperature and extracted with 1.5 ml of water. The extract was sparged briefly with nitrogen and filtered, to give 0.7 g of clear, colorless solution. This extract was found to contain 3% $H_2O_2$ by iodometry indicating about a 33% yield based on 9,10-dihydroanthryl hydroperoxide. The presence of hydrogen peroxide was confirmed by gas chromatography.

EXAMPLE 6

Amberlyst ® 15 (0.5 g; Rohm & Haas macroreticular sulfonic acid cation-exchange resin) was added to a solution of 0.50 g of the crude 9,10-dihydro-9-anthryl hydroperoxide of Example 4, and the mixture was stirred at room temperature for 30 minutes. A yellow solid began to precipitate within the first few minutes. The mixture was extracted with 2 ml of water, and the extract was sparged briefly with nitrogen and filtered, after which it weighed 1 g. Iodometry showed that this extract contained 2.4% $H_2O_2$, corresponding to a 39% yield based on the hydroperoxide. The presence of hydrogen peroxide was confirmed by gas chromatography.

EXAMPLE 7

9,10-Dihydro-9,10-dimethylanthracene was prepared by hydrogenation of 9,10-dimethylanthracene with Girdler G-22 copper chromite catalyst in toluene at 120° C. and 1500 psi for 1 hour. The mixtures resulting from five such runs were combined and filtered, and the off-white solid product was isolated by evaporating the solvent. It was characterized by nmr spectroscopy.

A solution of 1 g of the 9,10-dihydro-9,10-dimethylanthracene so prepared and 0.1 g of azobisisobutyronitrile in 5 ml of toluene was sparged with oxygen for 3 hr and 26 min in a flask immersed in an oil bath at 81° C. The mixture was cooled, and toluene was added to make up the loss by evaporation, to give a final volume of 5.5 ml. Iodometry on a 0.50-g sample indicated a yield of hydroperoxide of about 17%. Hydrogen chloride gas (10 cc) was added to the remainder of the solution, and after 10 minutes the mixture was extracted with 1 ml of water, to give 0.8 g of extract. Iodometry indicated a $H_2O_2$ content of about 1.5%, corresponding to a yield of about 8% based on 9,10-dihydro-9,10-dimethylanthracene. Gas chromatography indicated a $H_2O_2$ content of a little more than 1%.

I claim:

1. An improved process for producing hydrogen peroxide comprising:
   (a) hydrogenating a compound containing the anthracene nucleus to the corresponding 9,10-dihydroanthracene compound;
   (b) oxidizing the 9,10-dihydroanthracene compound so produced to the corresponding hydroperoxide;
   (c) contacting the hydroperoxide so produced with a catalytic amount of an acid catalyst to produce hydrogen peroxide and the starting compound containing the anthracene nucleus;
   (d) recycling the anthracene compound so produced to step (a); and
   (e) repeating steps (a) through (d) as desired and recovering the hydrogen peroxide.

2. The process of claim 1 wherein the catalyst is a cation-exchange material.

3. The process of claim 2 wherein the catalyst is a zeolite.

4. The process of claim 2 wherein the catalyst is a polystyrenesulfonic acid.

5. The process of claim 1 wherein said compound containing the anthracene nucleus is anthracene.

6. The process of claim 1 wherein said compound containing the anthracene nucleus is 9-methylanthracene.

7. The process of claim 1 wherein said compound containing the anthracene nucleus is 9,10-dimethylanthracene.

8. The process of claim 2 wherein the acid catalyst is selected from the class consisting of inorganic protonic acid, Lewis acid, organic sulfonic acid and carboxylic acid.

9. The process of claim 1 performed batchwise.

10. The process of claim 1 performed continuously.